US008062117B2

(12) United States Patent
Hsu

(10) Patent No.: US 8,062,117 B2
(45) Date of Patent: Nov. 22, 2011

(54) BINGO GAME APPARATUS WITH VARIABLE PAYOUT CAPABILITY

(76) Inventor: Tien-Shu Hsu, Taichung (TW)

( * ) Notice: Subject to any disclaimer, the term of this patent is extended or adjusted under 35 U.S.C. 154(b) by 758 days.

(21) Appl. No.: 12/134,724

(22) Filed: Jun. 6, 2008

(65) Prior Publication Data

US 2009/0305762 A1 Dec. 10, 2009

(51) Int. Cl.
*G06F 17/00* (2006.01)

(52) U.S. Cl. .......... 463/19

(58) Field of Classification Search .......... 463/16–29
See application file for complete search history.

(56) References Cited

U.S. PATENT DOCUMENTS 7,666,088 B2 * 2/2010 Cannon .......... 463/25
2006/0025198 A1 * 2/2006 Gail et al. .......... 463/19
2006/0073870 A1 * 4/2006 Cannon .......... 463/17
2009/0088239 A1 * 4/2009 Iddings et al. .......... 463/20
2010/0016059 A1 * 1/2010 Sims .......... 463/20

* cited by examiner

*Primary Examiner* — Ronald Laneau
(74) *Attorney, Agent, or Firm* — Hershkovitz & Associates, LLC; Abraham Hershkovitz

(57) ABSTRACT

A Bingo game apparatus with variable payout capability has a server apparatus and multiple player terminals. The server apparatus runs a Bingo game program with variable payout capability. The Bingo game program with variable payout capability has acts of: accepting to be selected pay rules, accepting to be bought Bingo cards, starting draw balls and resetting judgement. In the act of the accepting to be selected pay rules, the server apparatus generates a multiple pay rules table and sends the multiple pay rules table having multiple pay rules settings to the player terminals. A preferred pay rules setting is selected at the player terminal so increasing enjoyment by allowing players to select their pay-rules.

11 Claims, 3 Drawing Sheets

| PAY RULES SETTING 1 | |
|---|---|
| 46 BALLS | x280 |
| 51 BALLS | x220 |
| RESTS | x110 |

| PAY RULES SETTING 2 | |
|---|---|
| 45 BALLS | x1600 |
| 52 BALLS | x1200 |
| 49 BALLS | x600 |
| 51 BALLS | x400 |
| 53 BALLS | x250 |
| 55 BALLS | x180 |
| 57 BALLS | x120 |
| RESTS | x95 |

| PAY RULES SETTING 3 | |
|---|---|
| 45 BALLS | x3200 |
| 52 BALLS | x2400 |
| 49 BALLS | x1200 |
| 51 BALLS | x800 |
| 53 BALLS | x500 |
| 55 BALLS | x360 |
| 59 BALLS | x240 |
| RESTS | x90 |

FIG. 3

BINGO GAME APPARATUS WITH VARIABLE PAYOUT CAPABILITY

BACKGROUND OF THE INVENTION

1. Field of Invention

The present invention relates to a Bingo game apparatus, and more particularly to a Bingo game apparatus with variable payout capability.

2. Description of the Related Art

Bingo is a well known game. Players purchase at least one Bingo card which presents a 5×5 matrix (may also be a 3×3, 3×5 or the like matrix) to join in the game. Take the 5×5 matrix as example, columns of each Bingo card are respectively identified by letters B, I, N, G and O. A number is provided or printed in each coordinate (a position of the matrix of each Bingo card) in the matrix. Often, the center coordinate in the matrix leaves blank or is marked “Free” rather than having an assigned number. After each player has purchased a card, means are provided to randomly select numbers identified by the column letter and a number. For instance, O62 is denoted for a number “62” on column “O”. The printed numbers on the card correspond to the following arrangement: 1 to 15 in the B column; 16 to 30 in the I column; 31 to 45 in the N column; 46 to 60 in the G column and 61 to 75 in the O column. Typically, one number is provided by drawing a ball from a cage, a mixer or an electrical drawing machine, wherein multiple balls are contained inside the cage or the mixer and each ball is printed an independent number thereon.

The selection of balls continues until one player has a card marked (corresponding numbers have been drawn) in a winning pattern. This winning pattern might be designated before the game, such like a row, a column, two columns, four corners, an X-pattern, a cover all (all numbers on the Bingo card are covered) or the like.

However, to play the game a number of players are required to provide a number of Bingo cards with different numbers so that a single or few winners can be declared. Hence, the requirement of having a number of players perhaps hundreds of players is necessary for conventional Bingo game that is inflexible. Especially, payout rules of conventional Bingo game are also limited and discourage players since prizes of the game are fixed regardless of the number of players. Furthermore, players participate in the game under fixed pay rules and only have chances to win a fixed payout when one of the Bingo cards is Bingo. Two players have to share the prize when they have Bingo at the same time.

The present invention provides a Bingo game apparatus with variable payout capability and method of implementing the same to obviate or mitigate the shortcomings of the conventional electronic Bingo game apparatus.

SUMMARY OF THE INVENTION

The primary objective of the present invention is to provide a Bingo game apparatus with variable payout capability to improve game play.

The Bingo game apparatus with variable payout capability has a server apparatus and multiple player terminals. The server apparatus runs a Bingo game program with variable payout capability. The Bingo game program with variable payout capability comprises acts of: accepting to be selected pay rules, accepting to be bought Bingo cards, starting draw balls and resetting judgement. In the act of the accepting to be selected pay rules, the server apparatus generates a multiple pay rules table and sends the multiple pay rules table having multiple pay rules settings to the player terminals. A preferred pay rules setting is selected at the player terminal so increasing enjoyment by allowing players to select their pay rules.

Other objectives, advantages and novel features of the invention will become more apparent from the following detailed description when taken in conjunction with the accompanying drawings.

BRIEF DESCRIPTION OF THE DRAWINGS

FIG. 3 is a multiple pay rules table shown on an Input/Output interface in accordance with the present invention.

DETAILED DESCRIPTION OF THE INVENTION

Figure 1:
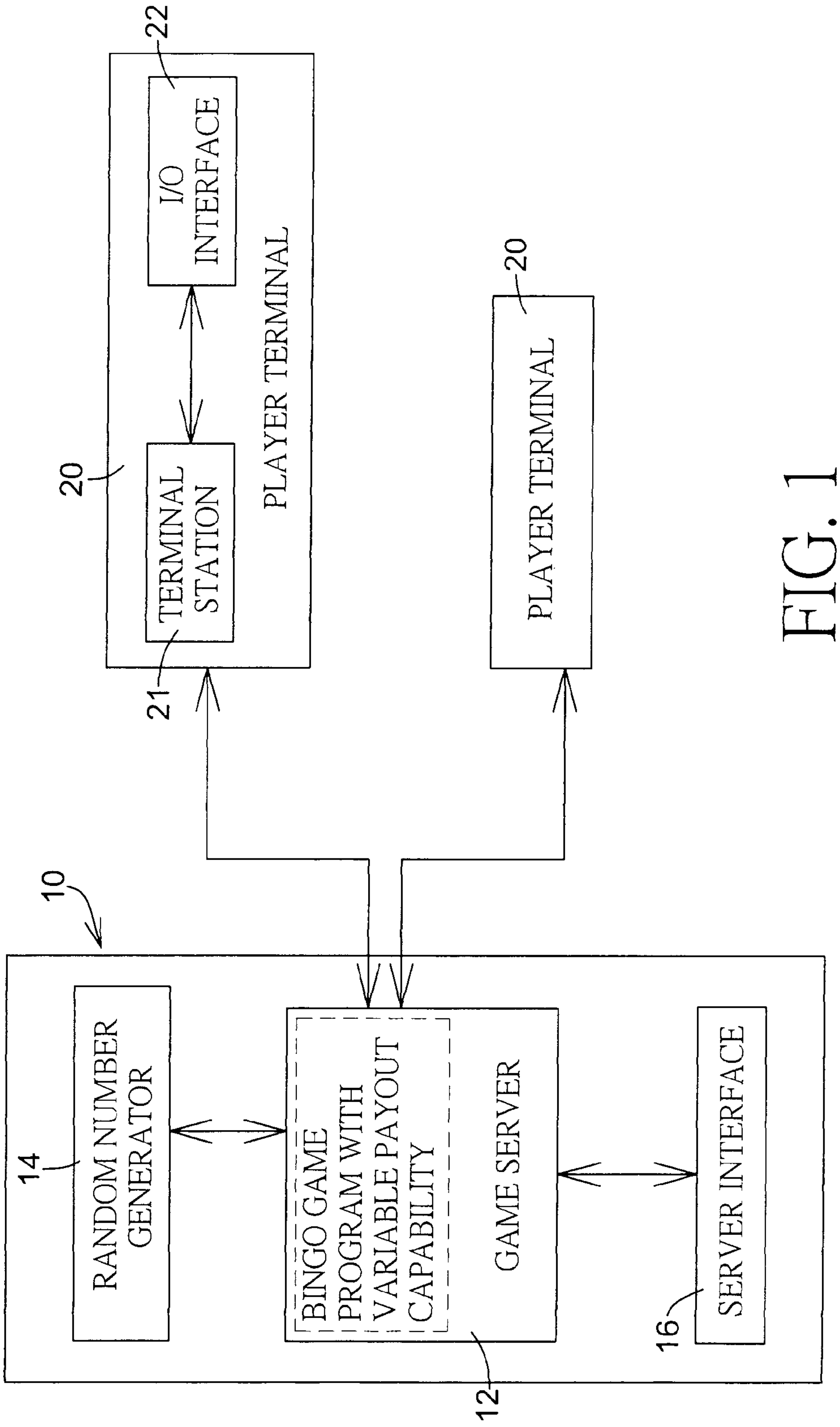
FIG. 1 is a block diagram of a Bingo game apparatus with variable payout capability in accordance with the present invention.

With reference to FIG. 1, a Bingo game apparatus with variable payout capability in accordance with the present invention comprises a server apparatus (10) and multiple player terminals (20).

The server apparatus (10) runs a Bingo game program with variable payout capability and has a game server (12), a random number generator (RNG) (14) and a server interface (16).

The game server (12) runs the Bingo game program with variable payout capability.

The RNG (14) is electronically connected to the game server (12), is controlled by the game server (12) to successively generate randomly one of a range of integers and may be a ball drawing machine or the like. The ball drawing machine contains multiple balls each having one of a set range of integers printed thereon and is controlled by the game server (12) to successively draw one of the balls to randomly generate a number one by one.

The server interface (16) is electronically connected to the game server (12) and is an electronic user interface for a house operator and may be a display, a voice generator or a display with a voice generator.

Each player terminal (20) is electronically connected to the game server (12), corresponds to a player for participating in the Bingo game program with variable payout capability and has a terminal station (21) and an Input/Output (I/O) interface (22).

The terminal station (21) is electronically connected to and interchanges electrical information with the game server (12) and may be a personal computer or the like.

The I/O interface (22) is electronically connected to the terminal station (21), displays information from the game server (12) for the corresponding person and accepts inputs by the person and may be a touch screen device, a display with a keyboard or the like.

Figure 2:
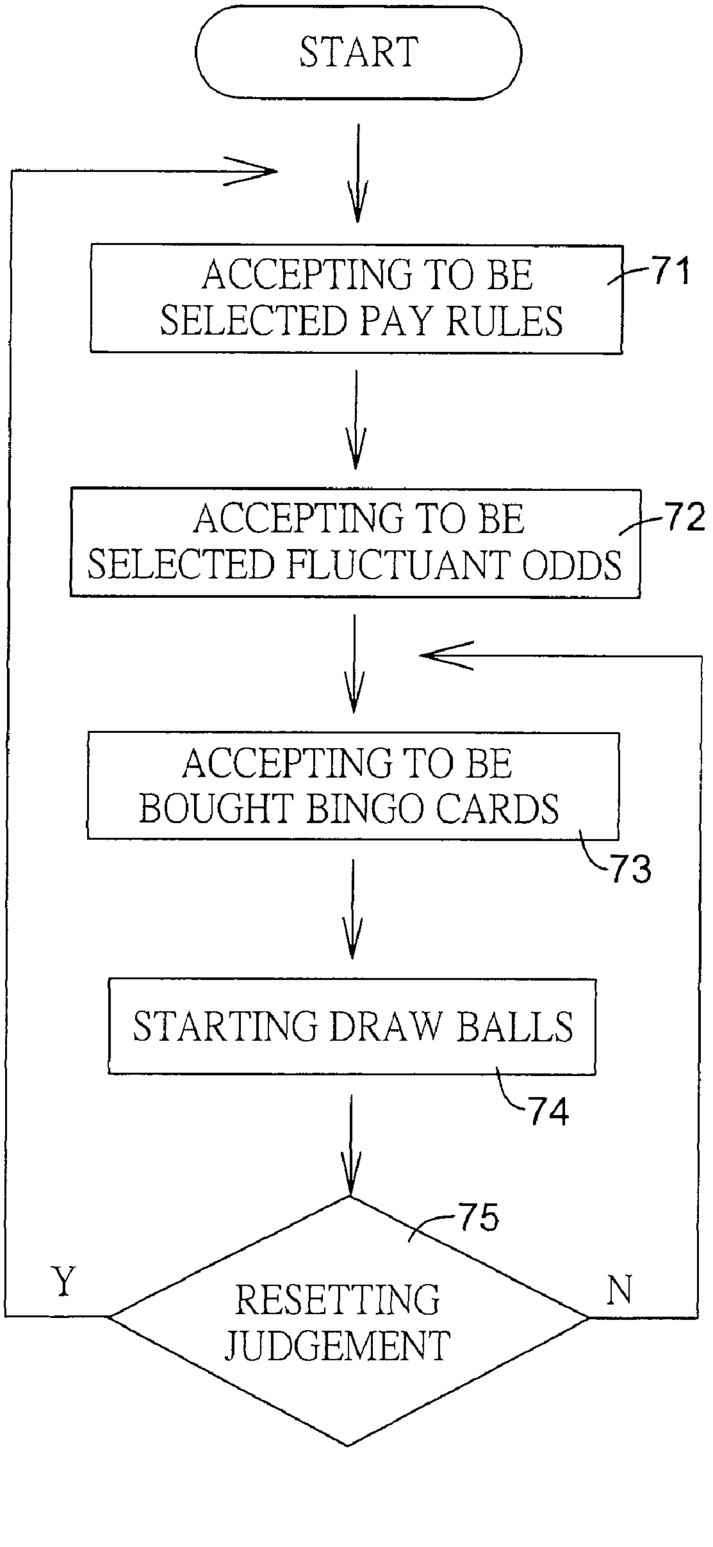
FIG. 2 is a flow chart of a Bingo game program with variable payout capability in accordance with the present invention.

With reference to FIG. 2, the Bingo game program with variable payout capability comprises acts of: accepting to be selected credit values (71), accepting to be selected pay rules (72), accepting to be bought Bingo cards (73), starting draw balls (74) and resetting judgement (75).

In the act of accepting to be selected credit values (71), a credit value table is created and is shown on the player terminals (20). The credit value may be created by the game server (12) or may be generated by each terminal station (21). The credit value table comprises multiple credit value items. Each credit value item defines a ratio of money being loaded into the player terminal (20) to credit points for the Bingo game program with variable payout capability. For instance, the credit value table comprises four credit value items, respectively are 1 dollar, 50 cents, 25 cents and 10 cents. A player selecting the 50 cents credit value item would receive two credit points for every dollar loaded.

In the act of accepting to be selected pay rules (72), the game server (12) generates a multiple pay rules table and sends the multiple pay rules table to the player terminals (20). The multiple pay rules table comprises multiple pay rules settings and each pay rules setting defines relations between counts of drawn integers (balls) being "Bingo" with pay rules. With further reference to FIG. 3, showing an example of the multiple pay rules shown on the I/O interface (22) having three pay rules settings titled "Pay rules setting 1", "Pay rules setting 2" and "Pay rules setting 3". Take Pay rules setting 1 as an example, if one player chooses the "Pay rules setting 1" for participating in the Bingo game program and if one Bingo card he bought achieving a cover all Bingo after 52 balls, he will win a pay out which is 110 times the wagers he bought the Bingo card.

In the act of accepting to be bought Bingo cards (73), the game server (12) generates a set of Bingo cards and sends the set Bingo cards to the player terminals (20). Each Bingo card is independent, may comprise a grid consisting of the same number of rows and columns (e.g. 5×5) and contain multiple integers selected from the integers (e.g. 1~75). Players buy and bet on preferred Bingo cards by using the I/O interface (22). For instance, the game server (12) provides 100 independent Bingo cards for the players in each gaming round, wherein the Bingo cards may be numbered from 00 to 99. Each Bingo card may comprise the integers that are printed into a 5×5 matrix-like, wherein arrangement of these integers in each Bingo card is exactly different to the other Bingo card. Each player may place bets or buys one or multiple preferred Bingo cards via the player terminal (20). The player can also buy one specific Bingo card for more wagers if he think the Bingo card has higher chances being "Bingo". For instance, the player can also buy five pieces of a same specific Bingo card to have chances to win more payout when the specific Bingo card achieving Bingo. In the act of starting draw balls (74), once a drawing condition has been satisfied, the game server (12) controls the RNG (14) to draw integers one by one and checking "Bingo" occurrences of the Bingo cards after each integer is drawn. The drawing condition may be a betting time (a count down period) or a number of selected Bingo cards. When the drawing condition is the betting time, Bingo cards may be purchased during the betting time and the game server (12) starts to control the RNG (14) to draw integers after the betting time has expired. To give an example, when the betting time is the count down period by 60 seconds, means of each player have 60 seconds to consider what and how many Bingo cards to buy at each gaming round.

When the drawing condition is the number of selected Bingo cards, the game server (12) starts to control the RNG (14) to draw integers once a pre-defined quantity of the Bingo cards has being bought. For example, the game server (12) will start to draw integers when over 5% of the Bingo cards are bought by the players. The game server (12) continuous to draw the balls one by one until at least one Bingo card achieving Bingo. Players win if "Bingo" occurs on Bingo cards they have bought.

In the act of resetting judgement (75), each player triggers the corresponded player terminal (20) to reloads the act of accepting to be selected credit values (71) so that the player may select preferred credit value item again from the credit value table to participate the Bingo game. Otherwise, the game server (12) runs the act of accepting to be bought Bingo cards (73) to start a new round.

Therefore, the players gain more enjoyment by being able to choose preferred pay rules settings on accepting to be selected multiple pay rules (72) at the beginning of each round.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A Bingo game apparatus with variable payout capability comprising a server apparatus running a Bingo game program with variable payout capability and having a game server running the Bingo game program with variable payout capability; and a server interface being electronically connected to the game server;

a Random Number Generator (RNG) being electronically connected to the game server and being controlled by the game server to successively generate randomly one of a range integers; and multiple player terminals being electronically connected to the game server and each having a terminal station being electronically connected to and interchanging electrical information with the game server; and an Input/ Output (I/O) interface being electronically connected to the terminal station, displaying electrical information from the game server and accepting inputs;

wherein, the Bingo game program comprises means of accepting to be selected credit values;

means of accepting to be selected pay rules, the game server generating a multiple pay rules table, the multiple pay rules table comprising multiple pay rules settings, each one of the pay rules settings defining relations between counts of drawn integers being "Bingo" and pay rules and the game server sending the multiple pay rules table to the player terminals;

means of accepting to be bought Bingo cards, the game server generating a set of Bingo cards and sending the Bingo cards to each player terminals, each Bingo cards being independent and containing multiple integers selected from the integers, thereby the player terminals being inputted to buy Bingo cards;

means of starting draw balls, satisfying a drawing condition and then the game server controlling the RNG to draw integers one by one and checking "Bingo" occurrences of the Bingo cards at each integer drawn; and means of resetting judgement, one of the player terminals being triggered to reload the act of accepting to be selected credit values, else to reload the accepting to be bought Bingo cards to restart a new round.

2. The Bingo game apparatus with variable payout capability as claimed in claim 1, wherein the drawing condition is a count down period.

3. The Bingo game apparatus with variable payout capability as claimed in claim 1, wherein the drawing condition is a number of Bingo cards being selected.

4. The Bingo game apparatus with variable payout capability as claimed in claim 2, wherein the RNG is a ball drawing machine.

5. The Bingo game apparatus with variable payout capability as claimed in claim 3, wherein the RNG is a ball drawing machine.

6. The Bingo game apparatus with variable payout capability as claimed in claim 2, wherein the server interface is a display.

7. The Bingo game apparatus with variable payout capability as claimed in claim 3, wherein the server interface is a display.

8. The Bingo game apparatus with variable payout capability as claimed in claim 2, wherein the server interface is a display with a voice generator.

9. The Bingo game apparatus with variable payout capability as claimed in claim 3, wherein the server interface is a display with a voice generator.

10. The Bingo game apparatus with variable payout capability as claimed in claim 2, wherein the I/O interface is a touch panel device.

11. The Bingo game apparatus with variable payout capability as claimed in claim 3, wherein the I/O interface is a touch panel device.

* * * * *